A. W. HALL.
FRICTION CLUTCH.
No. 74,080. Patented Feb. 4, 1868.
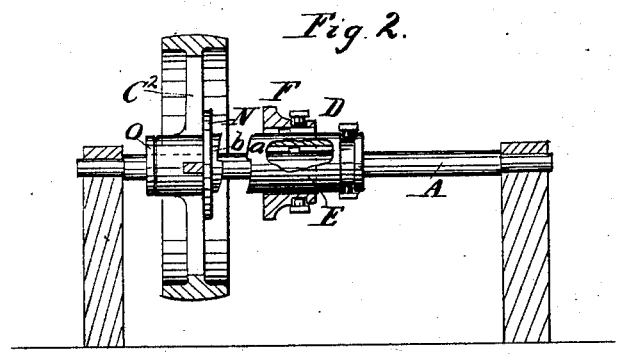
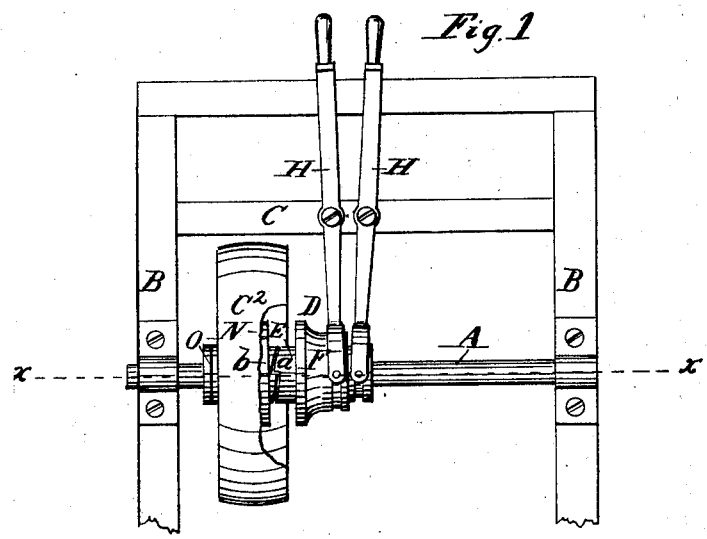

United States Patent Office.

A. W. HALL, OF EAST LEBANON, NEW HAMPSHIRE.

Letters Patent No. 74,080, dated February 4, 1868.

IMPROVED FRICTION-CLUTCH.

*The Schedule referred to in these Letters Patent and making part of the same.*

TO ALL WHOM IT MAY CONCERN:

Be it known that I, A. W. HALL, of East Lebanon, Grafton county, New Hampshire, have invented a new and improved Clutch; and I do hereby declare that the following is a full, clear, and exact description thereof, which will enable others skilled in the art to make and use the same, reference being had to the accompanying drawings forming part of this specification.

The present invention relates to an improved clutch, by means of which a pulley or other device can be clutched to and set free from a shaft, without the least jar or danger of breakage to the clutch, or the parts in connection with which it is arranged to operate. In the accompanying plate of drawings, my improved clutch is illustrated—

Figure 1 being a plan or top view of the same, and

Figure 2 a section, taken in the plane of the line $x\,x$, fig. 1.

A, in the drawings, represents a shaft, which, for convenience of illustration, is shown as supported in bearings at each end, or cross-piece B, of a frame, C. $C^2$, a loose pulley on shaft A, to connect which with the same, a clutch, D, is arranged upon the shaft; the construction of which will be now described.

This clutch D is made in two parts or sections, E and F, with the former, E, surrounding the shaft, and the latter, F, surrounding that; the inner one being splined to the shaft, and the outer to the inner, as plainly shown in the drawings, fig. 2, whereby, while susceptible of being slid, the one upon the shaft, and the other upon that which can play upon the shaft, they will both turn together and with the shaft as it revolves. For sliding the two plates E and F to the clutch on the shaft, they are each provided with a separate operating-lever, H, suitably connected therewith, so as not to interfere with their rotation with the shaft. The inner section of the clutch is, at its end toward the pulley, provided with ratchet-teeth $a$, so that when brought up against the side of the pulley thereto, and which is similarly provided with ratchet-teeth $b$, the two will be interlocked, and thus the pulley clutched to the shaft. The outer section of the clutch, at its end toward the pulley, is left smooth, so that when brought against the surface of N, surrounding the teeth to the pulley $C^2$, it will, by its friction thereon, clutch such pulley with the shaft; the pulley in this case, as well as in the case of the corner section, being held from moving away from either by means of the collar O around the shaft.

By the double clutch above described, it is plainly obvious that if the shaft is running at a speed, either more or less great, by moving the friction-clutch first against the pulley and then the ratchet-clutch, the pulley can be clutched to the shaft with no jar to the machinery, or danger of the breakage of parts.

Having thus described my invention, what I claim as new, and desire to secure by Letters Patent, is—

The two-part clutch E and F, substantially as and for the purpose described.

The above specification of my invention signed by me, this 18th day of April, 1867.

A. W. HALL.

Witnesses:
WM. F. McNAMARA,
ALEX. F. ROBERTS.